(12) United States Patent
Lin

(10) Patent No.: US 11,445,055 B1
(45) Date of Patent: Sep. 13, 2022

(54) HOLDER FOR HANDHELD COMMUNICATION DEVICE

(71) Applicant: Po-Hsun Lin, New Taipei (TW)

(72) Inventor: Po-Hsun Lin, New Taipei (TW)

( * ) Notice: Subject to any disclaimer, the term of this patent is extended or adjusted under 35 U.S.C. 154(b) by 0 days.

(21) Appl. No.: 17/394,421

(22) Filed: Aug. 5, 2021

(51) Int. Cl.
*H04M 1/04* (2006.01)
(52) U.S. Cl.
CPC ..................... *H04M 1/04* (2013.01)
(58) Field of Classification Search
CPC .......... H04M 1/04; H04M 1/06; H04M 1/724; H04M 1/725; H04B 1/3833; H04B 1/3877
See application file for complete search history.

(56) References Cited

U.S. PATENT DOCUMENTS

| 9,296,248 B1* | 3/2016 | Hansen | B42F 21/06 |
| 2019/0243419 A1* | 8/2019 | Charlesworth | A45C 11/00 |
| 2020/0237083 A1* | 7/2020 | Jin | A45C 11/00 |
| 2020/0344344 A1* | 10/2020 | Friedel | F16M 11/10 |

* cited by examiner

*Primary Examiner* — Thanh C Le

(57) ABSTRACT

A holder for a handheld communication device includes a body having an absorbing unit at front side thereof; a backing unit installed at a back side of the body; and the backing unit including: a pivotal unit and a supporting sheet pivotally retained to a standing sheet of the pivotal unit; that is, the supporting sheet being rotatable around the another end of standing sheet of the pivotal unit; a position embedding the magnet of the supporting sheet being opposite to a position embedding a magnet of the plane sheet of the pivotal unit; and wherein when the supporting sheet is expanded to be parallel to the plane sheet of the pivotal unit, by the magnetic property, the supporting sheet is steadily retained to the pivotal unit without vibration.

8 Claims, 13 Drawing Sheets

HOLDER FOR HANDHELD COMMUNICATION DEVICE

FIELD OF THE INVENTION

The present invention related to supporting holders for communication device, and in particular to a holder for a handheld communication device.

BACKGROUND OF THE INVENTION

Handheld communication devices (such as tablet computers, handsets, etc.) are main portable tools for modern human. Due to the population of smart phones, tablet computers, social media, etc., handheld communication devices are widely used in various applications, such as binge-watching dramas, seeing media, etc. Conventionally, for these handheld communication devices, other than holding by hands, they can sit on a table, however, at this state, the screen of the communication device must be adjusted to suit the viewing angle of the viewers. Currently, many different kinds of supporting covers or backing holders which are commonly called as supporting holders for handheld communication device are used to support the communication devices to be stood along an adjustable inclined angle or be fixed at a fixed angle. However the prior art supporting holders for handheld communication device has a complex structure and thus the operation of the device is tedious and it is complicated for assembling it to a storing state. Furthermore, the prior structure occupies a large space. Furthermore, the manufacturing cost is high and it is easy to be damaged.

SUMMARY OF THE INVENTION

Accordingly, the object of the present invention is to provide a holder for a handheld communication device, wherein a holder for a handheld communication device, comprising: a body having an absorbing unit at front side thereof; a backing unit installed at a back side of the body; and the backing unit including: a pivotal unit having one end combined to the back side of the body; the pivotal unit including a plane side adhered to the back side of the body and a standing sheet having one end standing from the plane side; the plane sheet of the pivotal unit having embedded with a magnet at one end thereof; a supporting sheet pivotally retained to another end of the standing sheet of the pivotal unit; that is, the supporting sheet being rotatable around the another end of standing sheet of the pivotal unit; the supporting sheet having embedded with a magnet at one side thereof; a position embedding the magnet of the supporting sheet being opposite to a position embedding the magnet of the plane sheet of the pivotal unit; and wherein when the supporting sheet is expanded to be parallel to the plane sheet of the pivotal unit, by the magnetic property, the supporting sheet is steadily retained to the pivotal unit without vibration.

BRIEF DESCRIPTION OF THE DRAWINGS

FIG. 5b is a schematic view showing another state of FIG. 5a.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
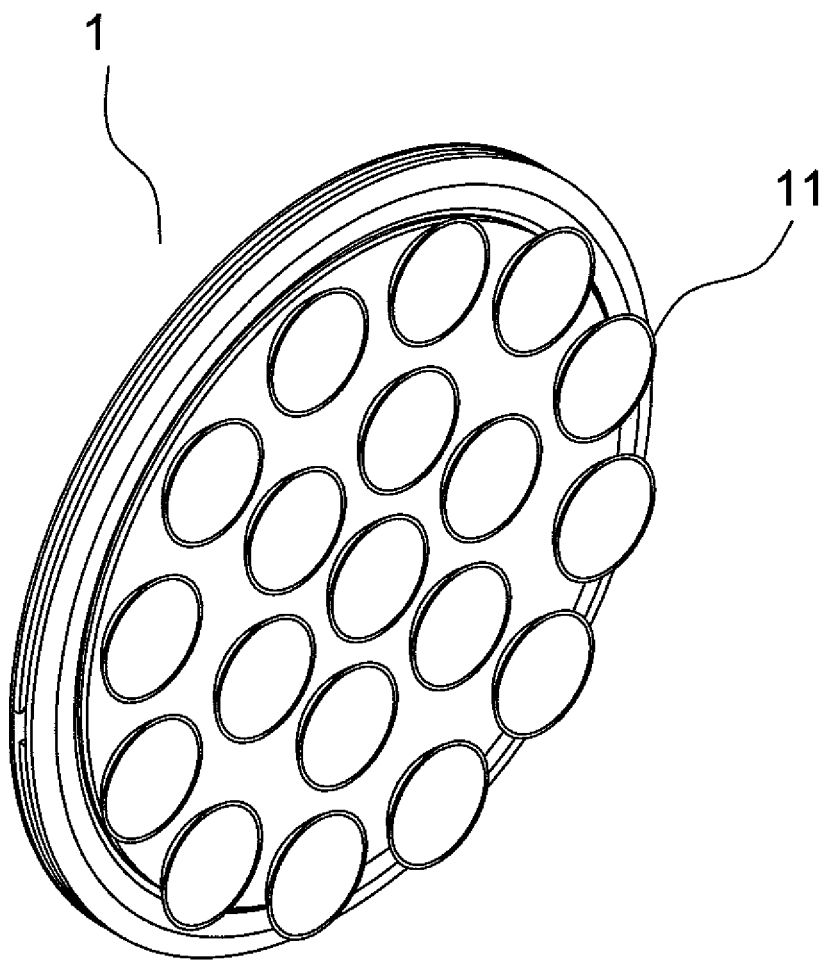
FIG. 1 is a perspective view showing that the present invention is in a storage state.
Figure 2:
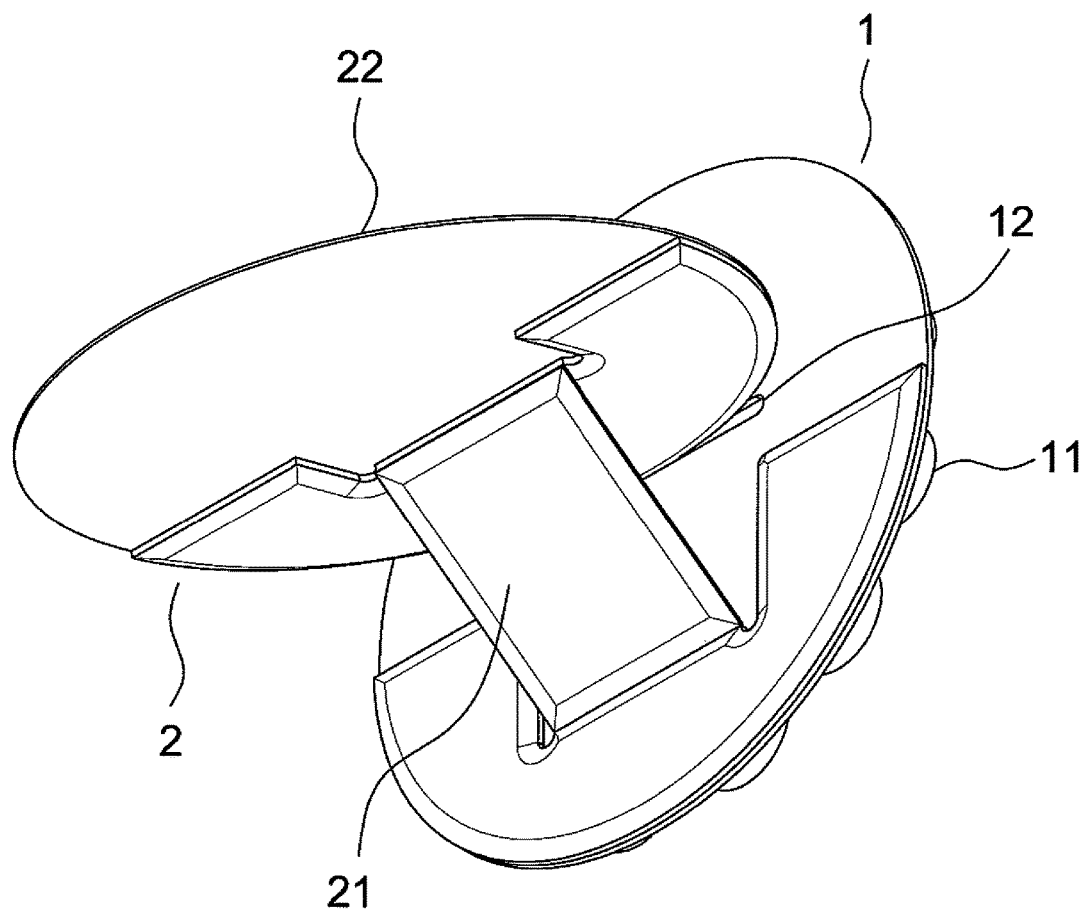
FIG. 2 is a backside view of the present invention, wherein the supporting sheet is expanded.
Figure 3:
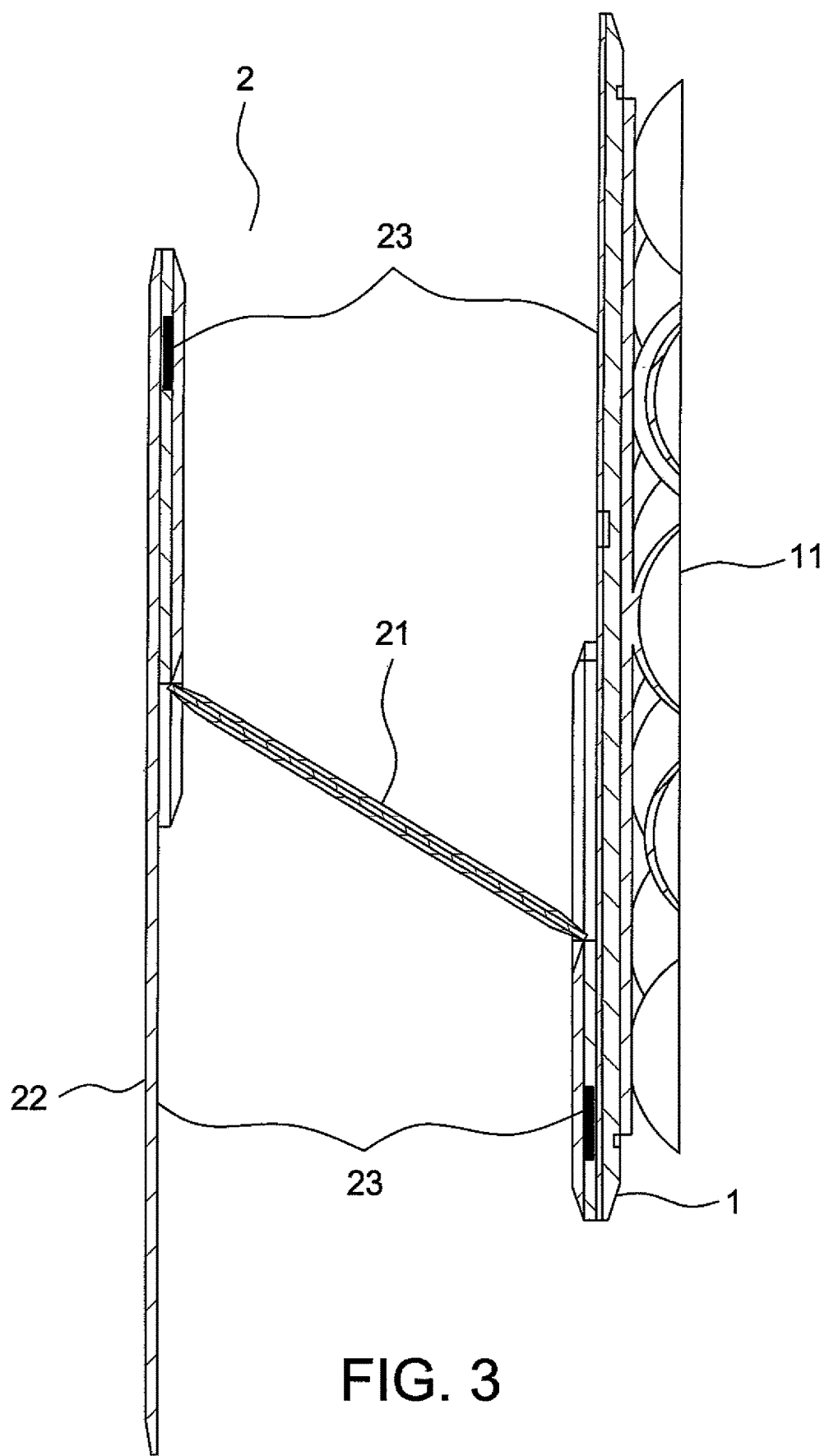
FIG. 3 is a side view of the present invention, in that the supporting sheet is parallel to the body.

With reference to FIGS. 1, 2 and 3, the structure of the present invention is illustrated. The present invention is related to a supporting holder of a handheld communication device. The present invention includes the following elements.

A body 1 has an absorbing unit 11 at front side thereof.

A backing unit 2 is installed at a back side of the body 1. The backing unit 2 has the following elements.

A pivotal unit 21 has one end combined to the back side of the body 1. The pivotal unit 21 includes a plane side adhered to the back side of the body 1 and a standing sheet having one end standing from the plane side. The plane sheet of the pivotal unit 21 has embedded with a magnet 23 at one end thereof.

A supporting sheet 22 is pivotally retained to another end of the standing sheet of the pivotal unit 21. That is, the supporting sheet 22 is rotatable around the another end of standing sheet of the pivotal unit 21. The supporting sheet 22 has embedded with a magnet 23 at one side thereof. The position embedding the magnet of the supporting sheet 22 is opposite to the position embedding the magnet of the plane sheet of the pivotal unit 21.

When the supporting sheet 22 is expanded to be parallel to the plane sheet of the pivotal unit 21, by the magnetic property, the supporting sheet 22 is steadily retained to the pivotal unit 21 without vibration.

The structure of this design is easy and simply and can be made with a simple mold. Furthermore, the operation is simple and easy.

Figure 4A:
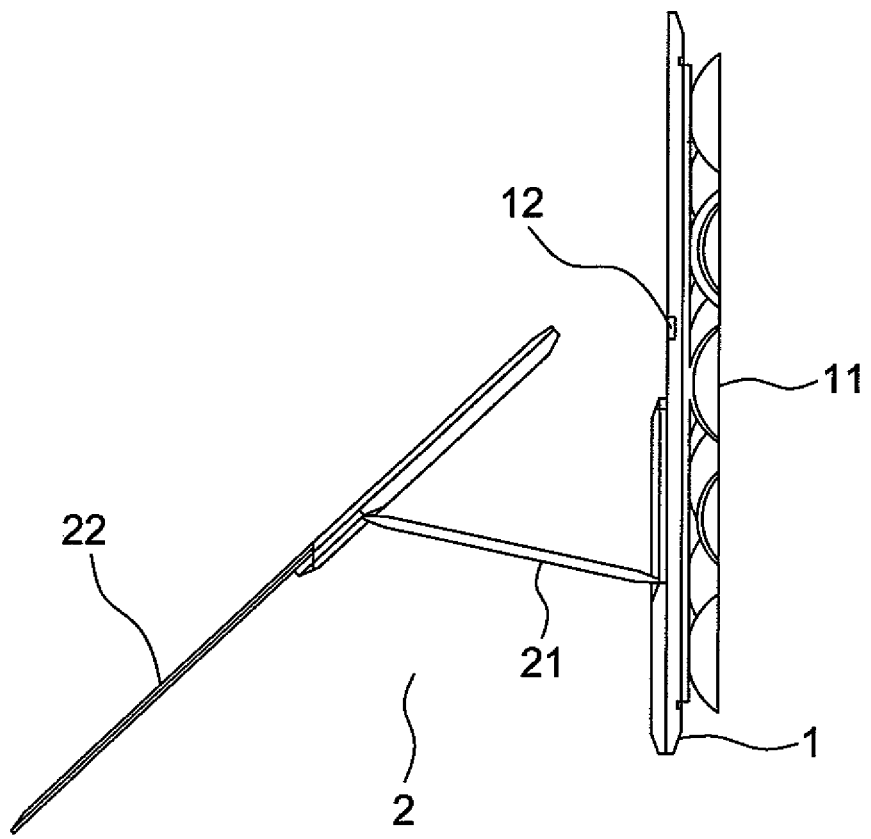
FIG. 4a is a schematic view showing one application state of the present invention.
Figure 4B:
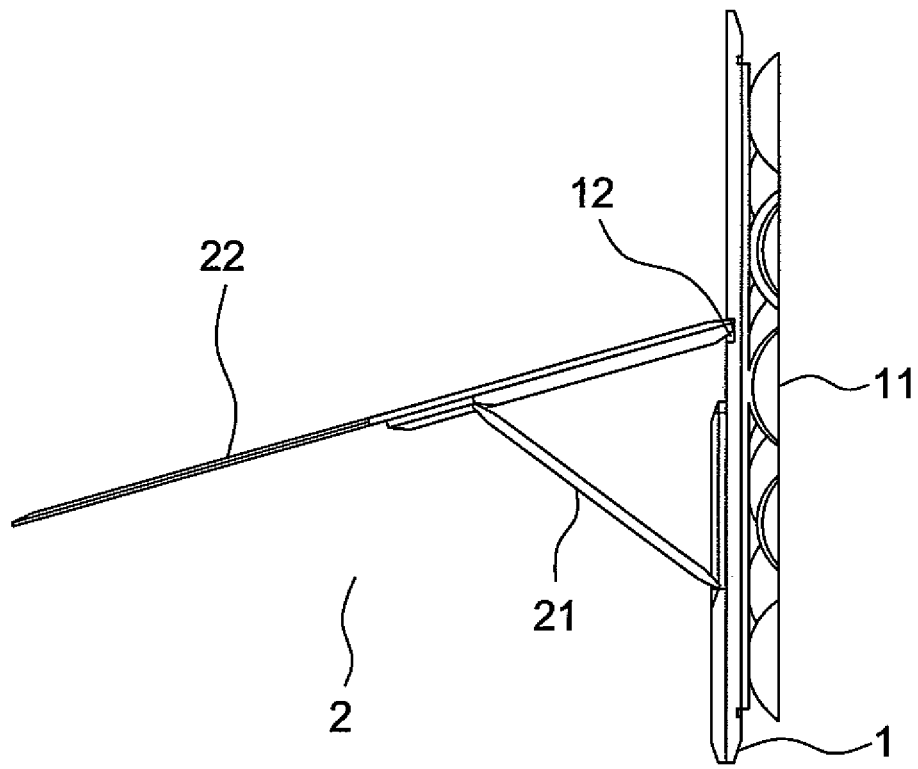
FIG. 4b is a schematic view showing another application state of the present invention.
Figure 5A:
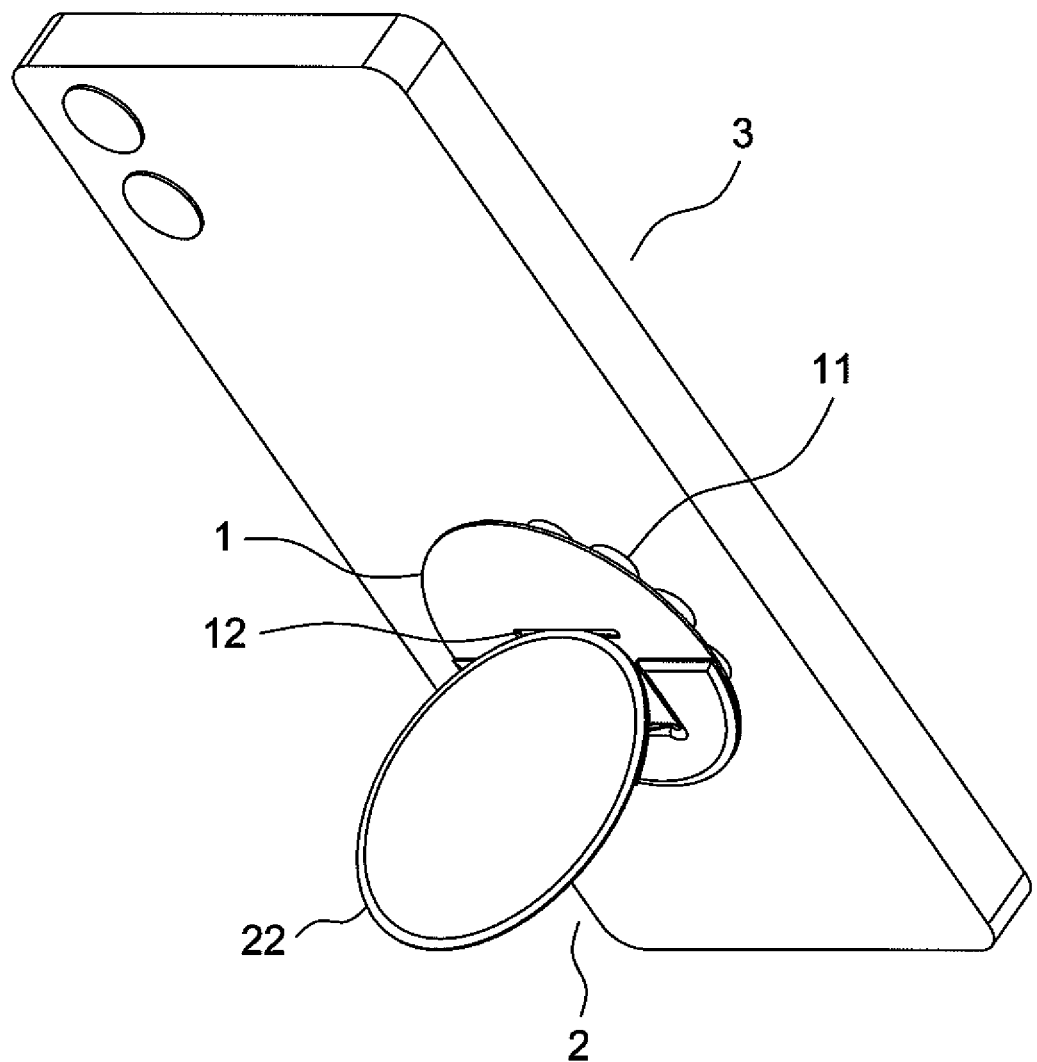
FIG. 5a is a schematic view showing that a mobile phone is attached to the structure of the present invention.
Figure 5B:
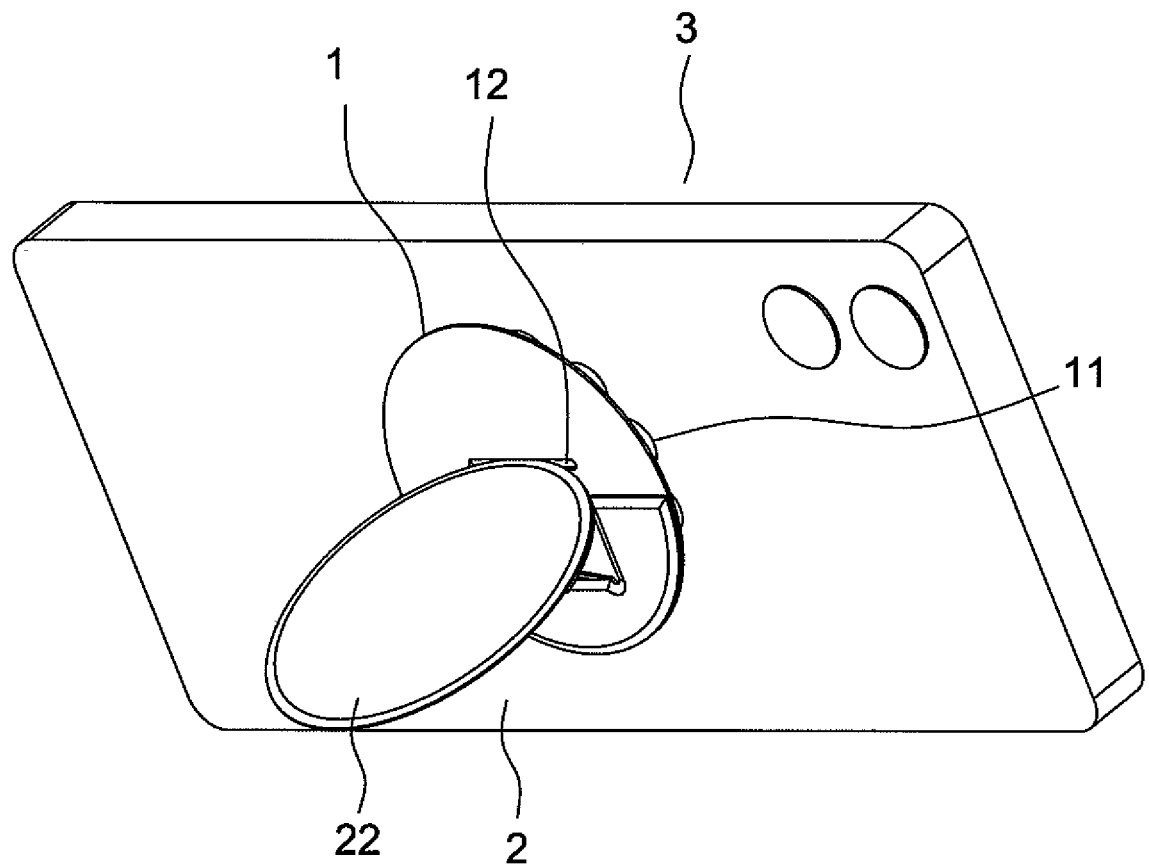

With reference to FIGS. 4a and 4b, it is illustrated that the back side of the body 1 is formed with a resisting recess 12. When the supporting sheet 22 is rotated downwards, one end of the supporting sheet 22 can be resisted against the resisting recess 12 and thus positioned therein. Referring to FIGS. 5a and 5b, they show one application of the present invention, in that a mobile phone 1 is placed on the front side of the body 1. The supporting sheet 22 can support the body 1 and thus the mobile phone 3 is steadily arranged along an inclined angle which is suitable for a viewer to view the screen of the mobile phone easily and comfortably.

Figure 6:
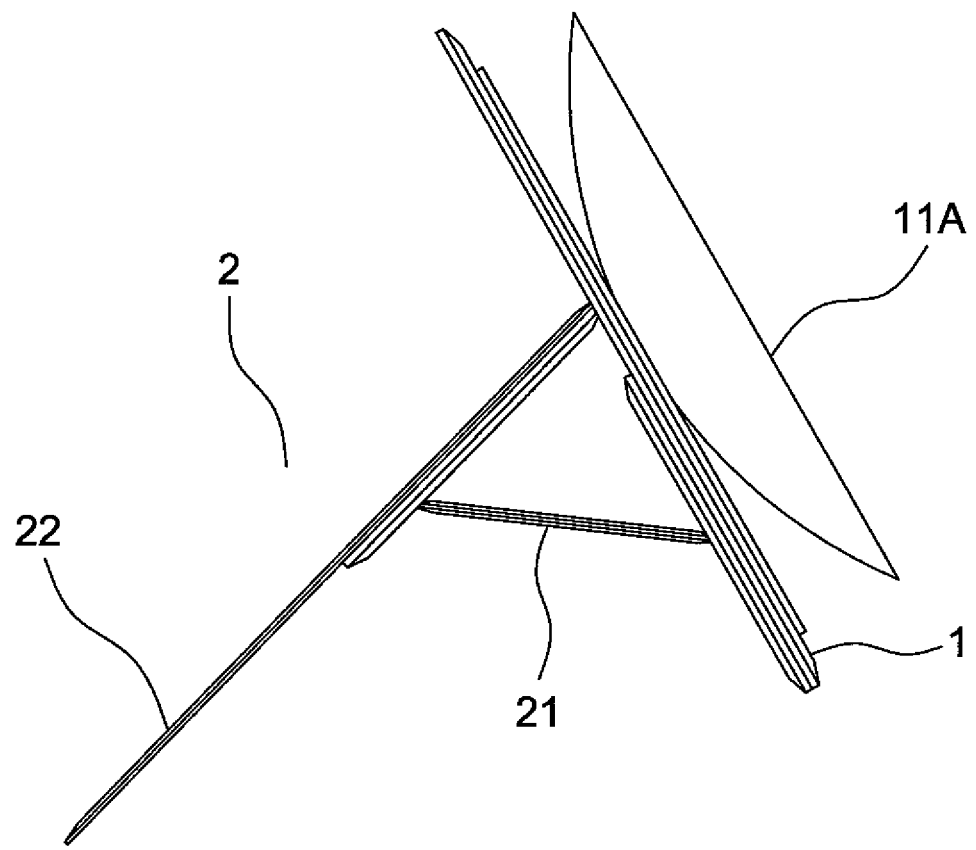
FIG. 6 shows an embodiment of the absorbing unit of the present invention.

With reference to FIGS. 1 and 6, it is illustrated that one absorbing unit 11 (see FIG. 1), 11A (see FIG. 6) is fixed to the front side of the body 1, in this example, the absorbing unit 11, 11A is a sucker assembly. In FIG. 1, the absorbing unit 11 is formed with a plurality of small suckers. In FIG. 6, the absorbing unit 11A has only one sucker.

Figure 7:
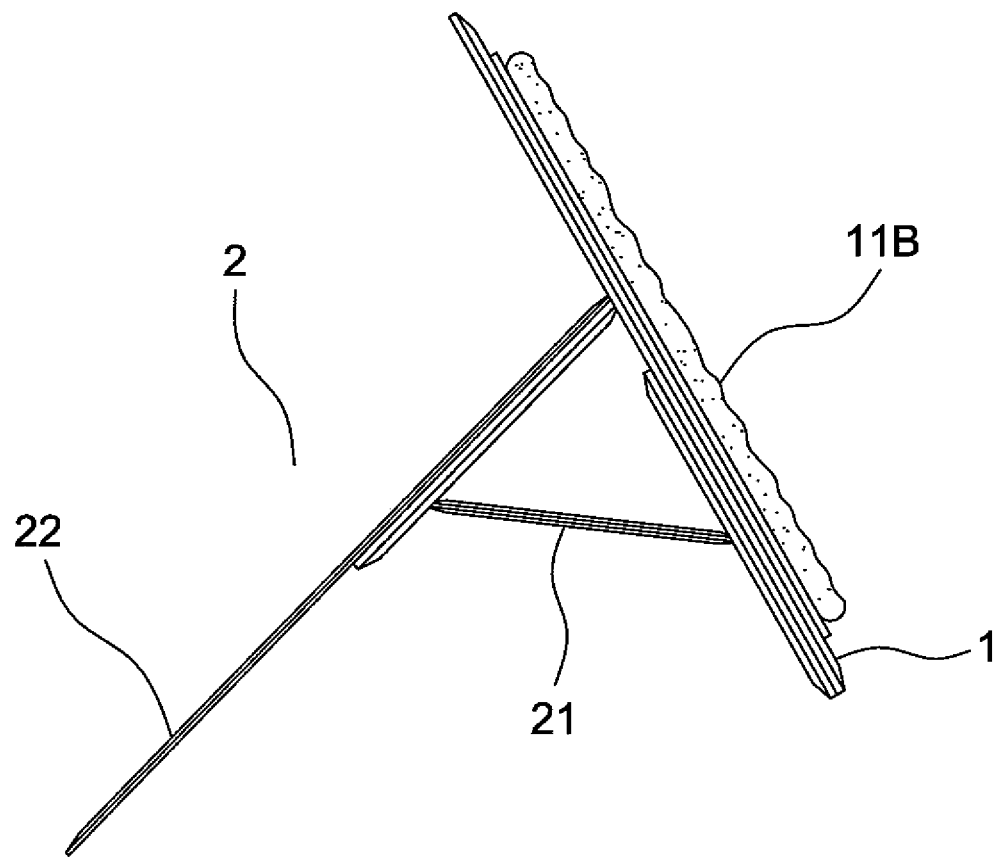
FIG. 7 shows another embodiment of the absorbing unit of the present invention.

Referring to FIG. 7, it is illustrated that the absorbing unit 11B is a pressure sensitive adhesive sheet which can adhere an object placed thereon firmly.

Figure 8:
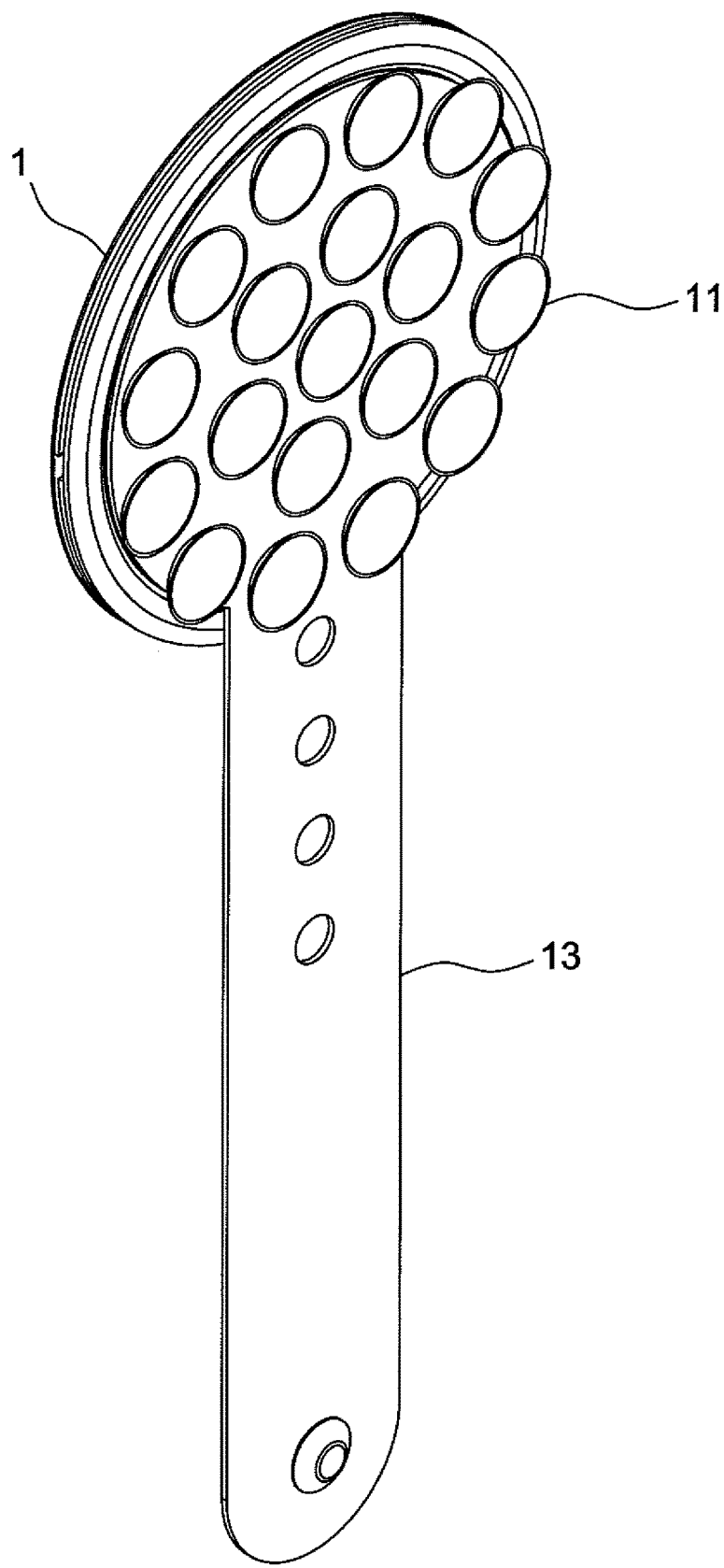
FIG. 8 is a schematic view showing that a strip is installed to the present invention.
Figure 9:
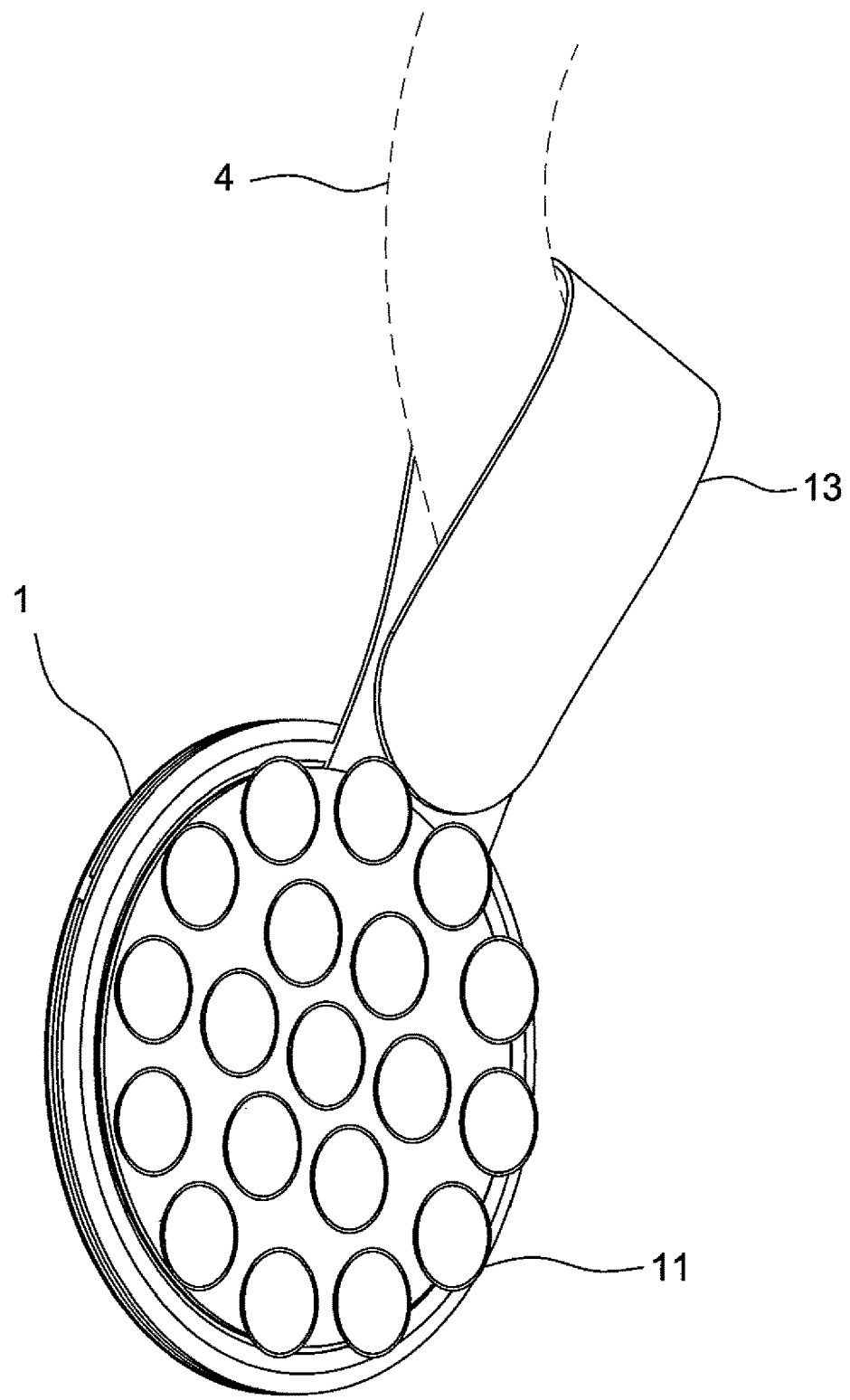
FIG. 9 shows an application of the structure in FIG. 8.
Figure 10:
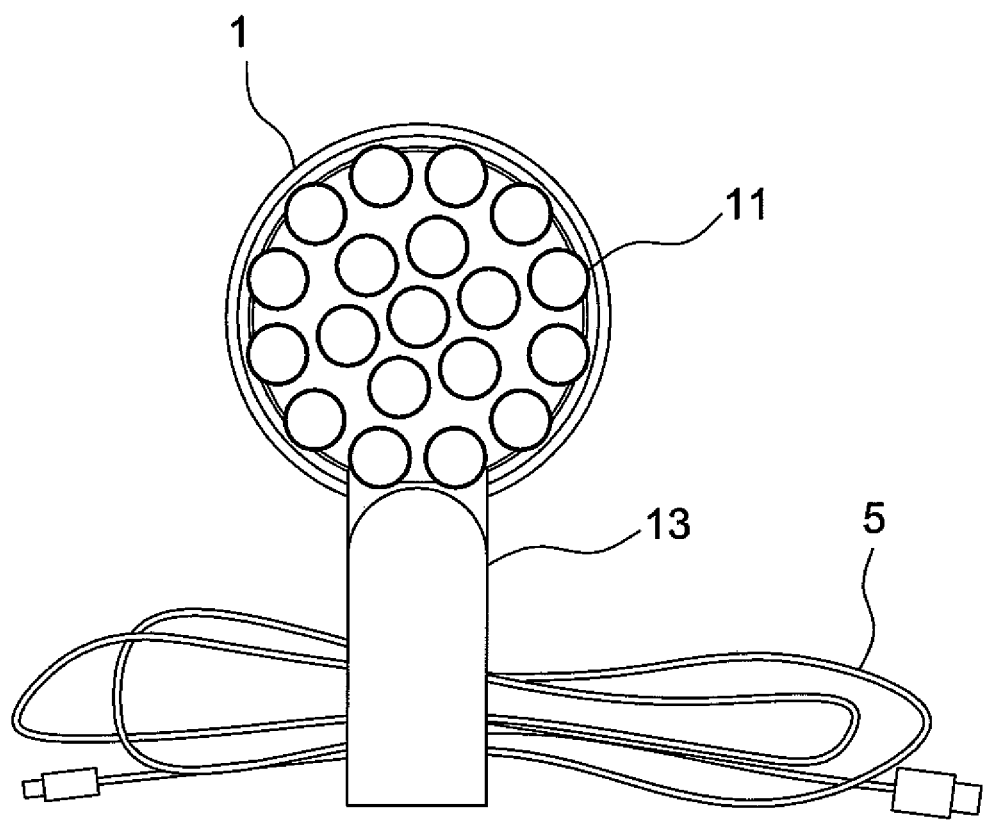
FIG. 10 shows another application of the structure in FIG. 8.

Referring to FIG. 8, it is illustrated that a bendable strip 13 is installed to the body 1. With reference to FIG. 9, it is illustrated that the bendable strip 13 winds around a belt 4 of a back bag. Referring to FIG. 10, the bendable strip 13 is wound as a closed circle and the wires 5 of a handset is received within the circle of the bendable strip 13.

Figure 11:
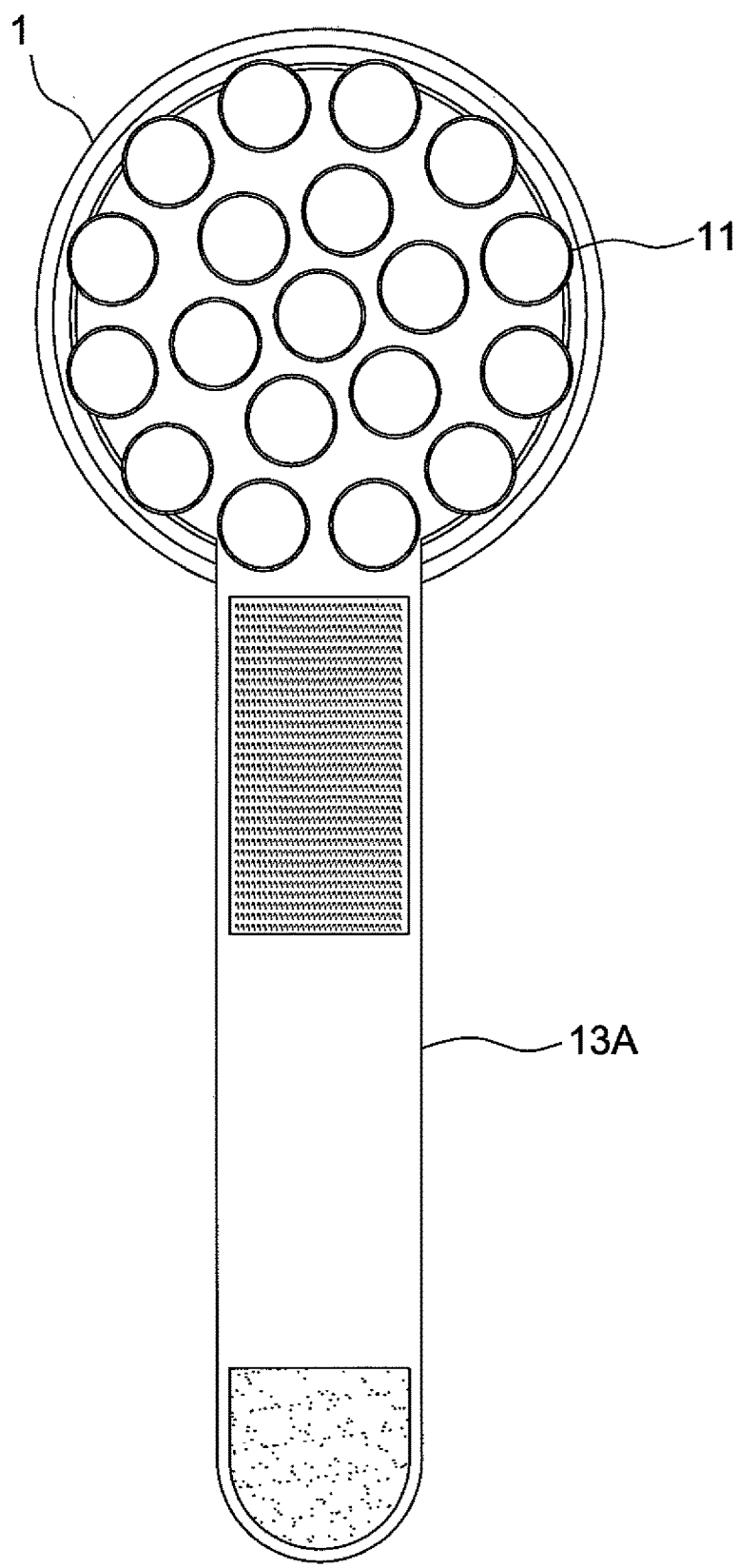
FIG. 11 shows another embodiment of the strip of the present invention.

Referring to FIG. 11, it is illustrated that a side of the bendable strip 13A is installed with Velcro or fasteners.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A holder for a handheld communication device, comprising:
    a body having an absorbing unit at front side thereof;
    a backing unit installed at a back side of the body; and the backing unit including:
    a pivotal unit having one end combined to the back side of the body; the pivotal unit including a plane side adhered to the back side of the body and a standing sheet having one end standing from the plane side; the plane sheet of the pivotal unit having embedded with a magnet at one end thereof;
    a supporting sheet pivotally retained to another end of the standing sheet of the pivotal unit; that is, the supporting sheet being rotatable around the another end of standing sheet of the pivotal unit; the supporting sheet having embedded with a magnet at one side thereof; a position embedding the magnet of the supporting sheet being opposite to a position embedding the magnet of the plane sheet of the pivotal unit; and
    wherein when the supporting sheet is expanded to be parallel to the plane sheet of the pivotal unit, by the magnetic property, the supporting sheet is steadily retained to the pivotal unit without vibration.

2. The holder for a handheld communication device as claimed in claim 1, wherein the back side of the body is formed with a resisting recess; when the supporting sheet is rotated downwards, one end of the supporting sheet can be resisted against the resisting recess and thus be positioned therein.

3. The holder for a handheld communication device as claimed in claim 1, wherein the absorbing unit is fixed to the front side of the body and the absorbing unit is a sucker assembly.

4. The holder for a handheld communication device as claimed in claim 3, wherein the such assembly is formed by a plurality of suckers.

5. The holder for a handheld communication device as claimed in claim 3, wherein the such assembly is formed by only one sucker.

6. The holder for a handheld communication device as claimed in claim 1, wherein the absorbing unit is a pressure sensitive adhesive sheet which can adhere an object placed thereon firmly.

7. The holder for a handheld communication device as claimed in claim 1, wherein a bendable strip is installed to the body.

8. The holder for a handheld communication device as claimed in claim 7, wherein a side of the bendable strip is installed with Velcro or fasteners.

\* \* \* \* \*